I. BLOOM & W. LEVIN.
HALTING DEVICE FOR RUNAWAY ANIMALS.
APPLICATION FILED JAN. 25, 1915.
1,176,645.
Patented Mar. 21, 1916.
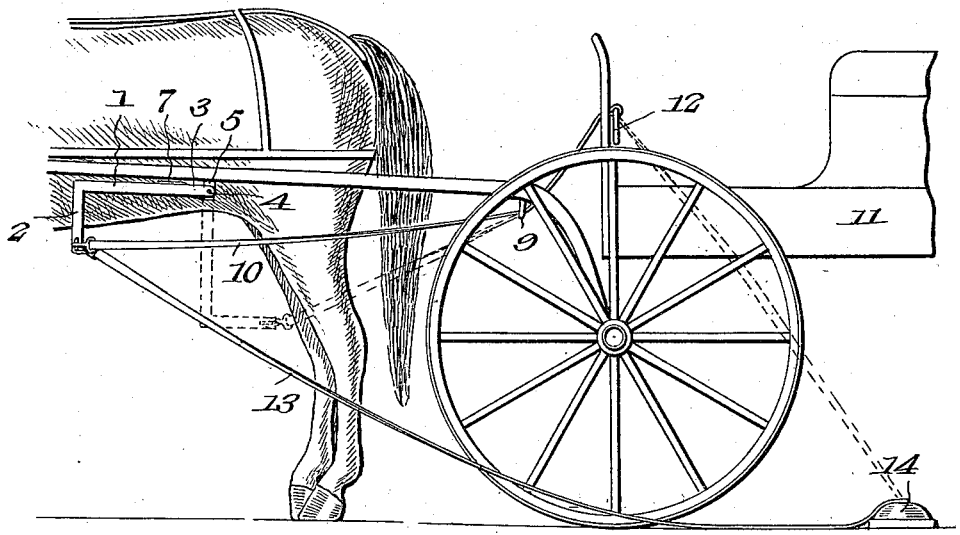
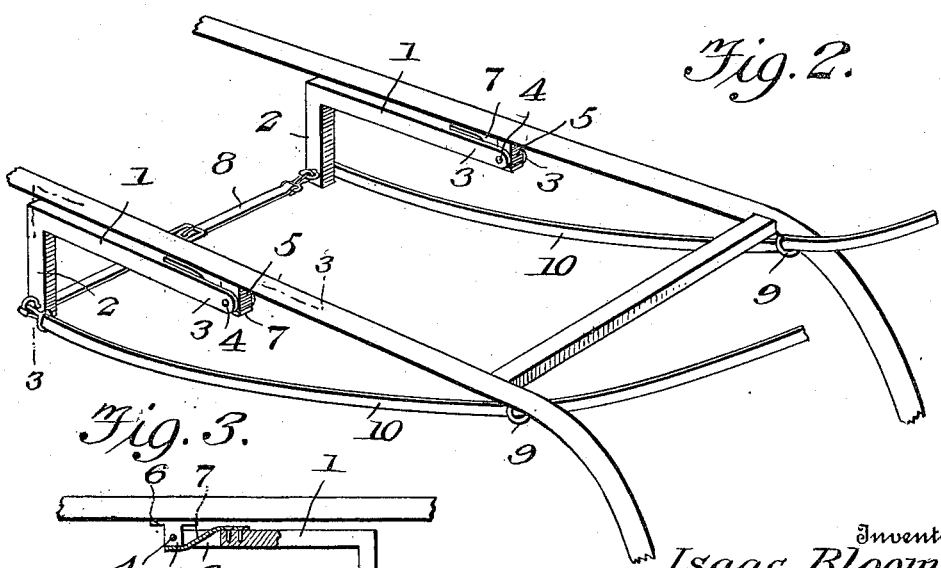
Inventors
Isaac Bloom
William Levin
By Victor J. Evans
Attorney

UNITED STATES PATENT OFFICE.

ISAAC BLOOM AND WILLIAM LEVIN, OF ROCHESTER, NEW YORK.

HALTING DEVICE FOR RUNAWAY ANIMALS.

1,176,645.      Specification of Letters Patent.      Patented Mar. 21, 1916.

Application filed January 25, 1915. Serial No. 4,333.

*To all whom it may concern:*

Be it known that we, ISAAC BLOOM and WILLIAM LEVIN, citizens of the United States, residing at Rochester, in the county of Monroe and State of New York, have invented new and useful Improvements in Halting Devices for Runaway Animals, of which the following is a specification.

The present invention relates to improvements in means for preventing an animal attached to a vehicle from running away, the object of the invention being to provide means attached to the shafts or thills of the vehicle and normally out of contact with the animal but which may be readily swung to engage with the hind legs of the animal to prevent movement of the same and so effectively halt the animal.

With the above and other objects in view, the improvement resides in the construction, combination and arrangement of parts set forth in the following specification and falling within the scope of the appended claims.

In the drawing: Figure 1 is a view illustrating the application of our improvement, the brake being shown in operative position by the dotted lines, Fig. 2 is an enlarged detail perspective view showing the arrangement of the improvement upon the shafts of a vehicle, and Fig. 3 is an enlarged sectional view approximately on the line 3—3 of Fig. 2.

The improvement is adapted to be attached to the thills of a shaft at a suitable distance forward of the connecting bar for the thills, and includes two like members, one arranged upon each of the thills or shafts. Each of the members includes an elongated arm 1 having one of its ends provided with a right angular arm 2 which may be and preferably is of a less length than the arm 1. The free end of the arm 1 is preferably bifurcated and provided with spaced projecting ears 3—3, a pivot 4 passing through the ears and through a lug 5 provided upon a suitable bracket 6 which is secured to the thills. The pivot 4 between the ears 3 is preferably square in cross section and is contacted by a flat spring 7 carried by the member 1, said spring serving to sustain the member 1 against the shaft as well as for retaining the members 1 and 2 swung angularly of the shaft to the operative position illustrated by the dotted lines in Fig. 1. Connecting the arm of the angular members between the thills or shafts is a strap 8 the said strap preferably comprising a pair of members, one having a buckle and the second having its end engaged by the finger of the buckle, and also the strap is preferably removably connected with the short arm of the angular members. The shafts, adjacent the connecting bar are preferably provided upon their underfaces with guides 9 through which pass the flexible elements 10, the said elements being connected with the short arms 2 of the angular members. Preferably two flexible members 10 are employed, the same passing through a suitable opening in the dashboard of the vehicle 11 and being connected by a ring 12. It will be obvious that when a pull is exerted upon the ring 12, the flexible members 11 will be drawn taut, swinging the angular members 1 so that the strap 8 will contact with the hind legs of the animal attached to the vehicle and so preventing the use of the animal's legs and consequently halting him. Either connected with the strap 8, one of the arms 2 of either of the angular members or connected with the ring 12 is a strap or other flexible element 13 upon which is arranged a weight 14. This weight is carried in the vehicle when the animal is in motion, and is adapted to be thrown to the ground when the animal is halted. It will be noted that should the animal attempt to move when the driver is not in the vehicle, the weight will draw the member 13 taut, swinging the angular members upon their pivots and causing the strap 8 to again contact with the legs of the animal to prevent the animal from running away.

From the above description, taken in connection with the accompanying drawing, the simplicity of the device, as well as the advantages thereof will, it is thought, be perfectly apparent to those skilled in the art to which such invention appertains without further detailed description.

Having thus described the invention, what we claim is:

1. A brake or stopping device for runaway animals including a vehicle having shafts to which the animal is hitched, pivoted angular members upon the shaft, a connecting member for the angular members, and means for swinging the angular members to bring the connecting member into contact with the front portion of the hind legs of the animal.

2. In a brake or stop for runaway animals attached to a vehicle, of angular members pivoted to the shafts of the vehicle, springs for sustaining the angular members in two positions either against the shafts or when swung upon their pivots away from the shafts, a removable and adjustable element connecting the angular members, and means for swinging the angular members to bring the connecting member into contact with the front portion of the rear legs of the animal.

3. In a stop or brake for halting runaway animals attached to a vehicle, the combination of pivoted members arranged upon the underfaces of the shafts of the vehicle, a connecting strap for the pivoted members, and means for swinging the pivoted members to bring the connecting strap into contact with the front portion of the legs of the animal.

In testimony whereof we affix our signatures in presence of two witnesses.

ISAAC BLOOM.
WILLIAM LEVIN.

Witnesses:
JOSEPH HAUNFT,
ABRAM RAPPAPORT.

Copies of this patent may be obtained for five cents each, by addressing the "Commissioner of Patents, Washington, D. C."